United States Patent
Wagatsuma

(10) Patent No.: US 10,430,074 B2
(45) Date of Patent: Oct. 1, 2019

(54) WINDOW CHANGE CONTROL METHOD, WINDOW CHANGE CONTROL DEVICE, AND NON-TRANSITORY COMPUTER-READABLE RECORDING MEDIUM

(71) Applicant: Konica Minolta, Inc., Chiyoda-ku, Tokyo (JP)

(72) Inventor: Yoshifumi Wagatsuma, Koganei (JP)

(73) Assignee: KONICA MINOLTA, INC., Tokyo (JP)

( * ) Notice: Subject to any disclaimer, the term of this patent is extended or adjusted under 35 U.S.C. 154(b) by 261 days.

(21) Appl. No.: 15/239,421

(22) Filed: Aug. 17, 2016

(65) Prior Publication Data

US 2017/0090731 A1 Mar. 30, 2017

(30) Foreign Application Priority Data

Sep. 29, 2015 (JP) ................................. 2015-190816

(51) Int. Cl.
| | |
|---|---|
| *G06F 3/0481* | (2013.01) |
| *G06F 3/048* | (2013.01) |
| *G06F 3/0484* | (2013.01) |
| *G06F 3/0488* | (2013.01) |
| *G07F 9/00* | (2006.01) |
| *G07F 9/02* | (2006.01) |
| *H04N 1/00* | (2006.01) |

(52) U.S. Cl.
CPC ........ *G06F 3/04883* (2013.01); *G06F 3/0481* (2013.01); *G07F 9/006* (2013.01); *G07F 9/023* (2013.01); *H04N 1/00411* (2013.01); *H04N 2201/0094* (2013.01)

(58) Field of Classification Search
None
See application file for complete search history.

(56) References Cited

U.S. PATENT DOCUMENTS

| 5,877,763 | A | * | 3/1999 | Berry | .................... G06F 3/0481 715/803 |
| 6,184,883 | B1 | * | 2/2001 | Bates | .................... G06F 3/0481 715/794 |
| 9,990,483 | B2 | * | 6/2018 | Sahu | ....................... G06F 21/45 |

(Continued)

FOREIGN PATENT DOCUMENTS

JP 2014-89493 A 5/2014

*Primary Examiner* — Nhat Huy T Nguyen
(74) *Attorney, Agent, or Firm* — Squire Patton Boggs (US) LLP

(57) ABSTRACT

Disclosed is a window change control method for controlling a change in a window displayed on an operation panel, including: changing a state of the operation panel from a first state to a second state in accordance with a user's operation; measuring the first elapsed time which elapses since the state of the operation panel is changed from the first state to the second state, or the second elapsed time which elapses since a final operation is received, as a non-operation continuation time; automatically changing the state of the operation panel from the second state to the first state when the non-operation continuation time exceeds a threshold value; and changing the threshold value in accordance with a use result of the first electronic apparatus and the second electronic apparatus.

21 Claims, 16 Drawing Sheets

(56) References Cited

U.S. PATENT DOCUMENTS

2009/0094551 A1* 4/2009 Alkov .................... G06F 21/31
715/802
2009/0125850 A1* 5/2009 Karstens ............... G06F 3/0481
715/866

* cited by examiner

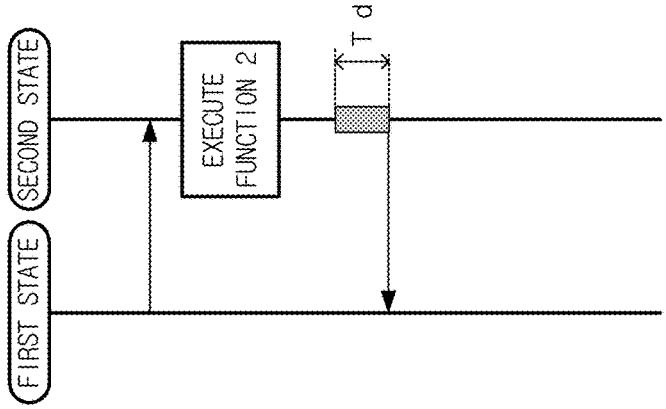
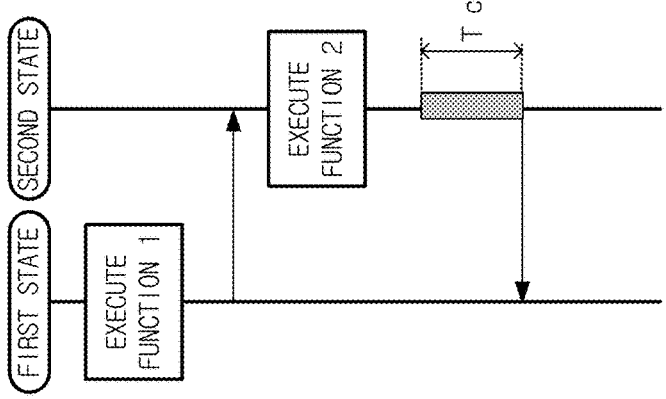
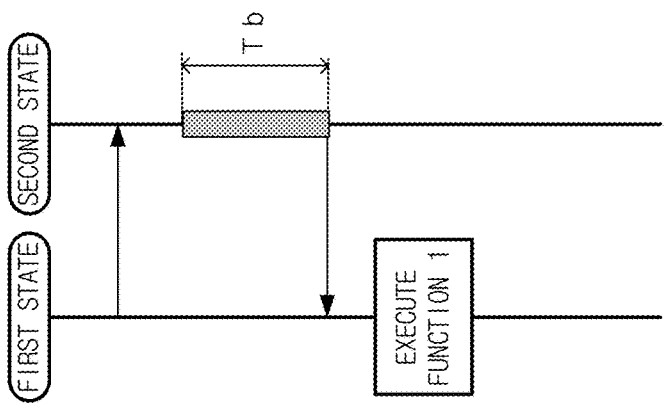
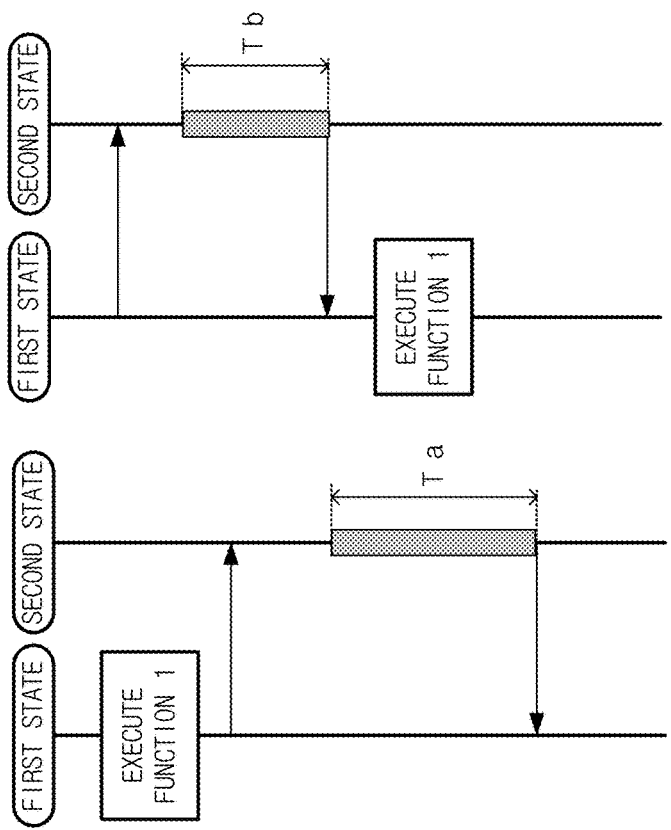

| FUNCTION OF FIRST ELECTRONIC APPARATUS | FUNTION OF SECOND ELECTRONIC APPARATUS | THRESHOLD VALUE |
|---|---|---|
| USED | USED | T c |
| USED | UNUSED | T a |
| UNUSED | USED | T d |
| UNUSED | UNUSED | T b |

WINDOW CHANGE CONTROL METHOD, WINDOW CHANGE CONTROL DEVICE, AND NON-TRANSITORY COMPUTER-READABLE RECORDING MEDIUM

BACKGROUND OF THE INVENTION

Field of the Invention

The present invention relates to a window change control method, a window change control device and a non-transitory computer-readable recording medium for changing a window displayed on an operation panel.

Description of Related Art

In an electronic apparatus having a plurality of functions or a group of electronic apparatuses combined with each other, an operation screen for using each function or each electronic apparatus is provided. Then, the operation window displayed on the operation screen is changed by a user according to the function or the electronic apparatus to be used by the user. For example, in Japanese Patent Application Publication No. 2014-89493, a device in which operation buttons for the respective functions are provided on the menu window, and when one operation button is pressed, the displayed window is changed to the operation window for the function corresponding to the pressed operation button, is disclosed.

In the operation windows, like the default window, the operation window having the function as the start point of the operation is provided. In order to use the default window as the start point of the operation, in general, in case that non-operation state is continued for the predetermined time or more after the displayed window is changed from the default window to another operation window, the displayed window automatically returns to the default window.

Conventionally, the function for automatically changing the displayed window to the default window due to the continuation of the non-operation state has been used for the next user who starts the operation or for the energy saving (for example, stopping the power supply to the element relating to the electronic apparatus which is in the non-operation state).

As a case in which the non-operation state is continued after the window is changed, for example, because a user who changes the operation window from the default window to the operation window for another function or another electronic apparatus in error, searches the operation method for returning to the default window and is puzzled, the non-operation state is continued. Alternatively, a user changes the window in order to use another function or another electronic apparatus, however, because the user does not understand the method for using the intended function or the intended electronic apparatus and is puzzled, the non-operation state is continued after the window is changed. In the former case, it is preferable to automatically change the window to the default window due to the non-operation state which is continued for a short time. In the latter case, by automatically changing the window to the default window due to the continuation of the non-operation state for a short time, the user's convenience is decreased.

However, conventionally, even in both cases, the window is automatically changed after the non-operation state is continued for a constant time. Therefore, it is not possible to assist the operation of a user who currently uses the function of the electronic apparatus according to the user's situation by using the function for automatically changing the window. As a result, it is not possible to improve the user's convenience.

Further, there is a request for guiding a user to the operation flow which is recommended by a system administrator or the like. However, in a conventional technology, the continuation time of the non-operation state, which is necessary to automatically return to the default window, is constant. Therefore, it is not possible to satisfy the above request by using the function for automatically changing the window.

SUMMARY

To achieve at least one of the abovementioned objects, a window change control method reflecting one aspect of the present invention, for controlling a change in a window displayed on an operation panel which is commonly used for displaying a first operation window for using a first electronic apparatus and for displaying a second operation window for using a second electronic apparatus, comprises:

changing a state of the operation panel from a first state in which the first operation window is displayed to a second state in which the second operation window is displayed, in accordance with a user's operation;

measuring a first elapsed time until a next operation is received after the state of the operation panel is changed from the first state to the second state, the first elapsed time elapsing since the state of the operation panel is changed from the first state to the second state, or a second elapsed time when any operation is received after the state of the operation panel is changed to the second state, the second elapsed time elapsing since a final operation is received, as a non-operation continuation time;

automatically changing the state of the operation panel from the second state to the first state when the non-operation continuation time exceeds a threshold value; and changing the threshold value in accordance with a use result of the first electronic apparatus and the second electronic apparatus, in which one user uses the first electronic apparatus and/or the second electronic apparatus since the one user starts using the first electronic apparatus or the second electronic apparatus.

Preferably, in the changing of the threshold value, the threshold value is increased when the first electronic apparatus is used.

Preferably, in the changing of the threshold value, the threshold value is decreased when the second electronic apparatus is used.

Preferably, the first electronic apparatus is an electronic apparatus which is used as a default.

Preferably, in the changing of the threshold value, when the state of the operation panel is changed to the second state without using the first electronic apparatus which is an electronic apparatus to be used as a default, the threshold value is set shortly as compared with a case in which the state of the operation panel is changed to the second state after the first electronic apparatus is used.

Preferably, in the changing of the threshold value, when the state of the operation panel is changed to the second state after the first electronic apparatus which is an electronic apparatus to be used as a default is used and then the second electronic apparatus is used, the threshold value is set shortly as compared with a case in which the state of the operation panel is changed to the second state without using the first electronic apparatus and then the second electronic apparatus is not used.

Preferably, in the changing of the threshold value, when the state of the operation panel is changed to the second state without using the first electronic apparatus which is an electronic apparatus to be used as a default and then the second electronic apparatus is used, the threshold value is set shortly as compared with a case in which the state of the operation panel is changed to the second state after the first electronic apparatus is used and then the second electronic apparatus is used.

BRIEF DESCRIPTION OF THE DRAWINGS

The present invention will become more fully understood from the detailed description given hereinafter and the accompanying drawings given by way of illustration only, and thus are not intended as a definition of the limits of the present invention, and wherein:

FIGS. 5A to 5D are sequence diagrams showing the relation between the use result of the function of the first electronic apparatus (automatic vending machine) and the function of the second electronic apparatus (image forming apparatus) and the threshold value to be compared with the non-operation continuation time;

DETAILED DESCRIPTION OF PREFERRED EMBODIMENT

Hereinafter, a preferred embodiment of the present invention will be explained with reference to the accompanying drawings.

Figure 1:
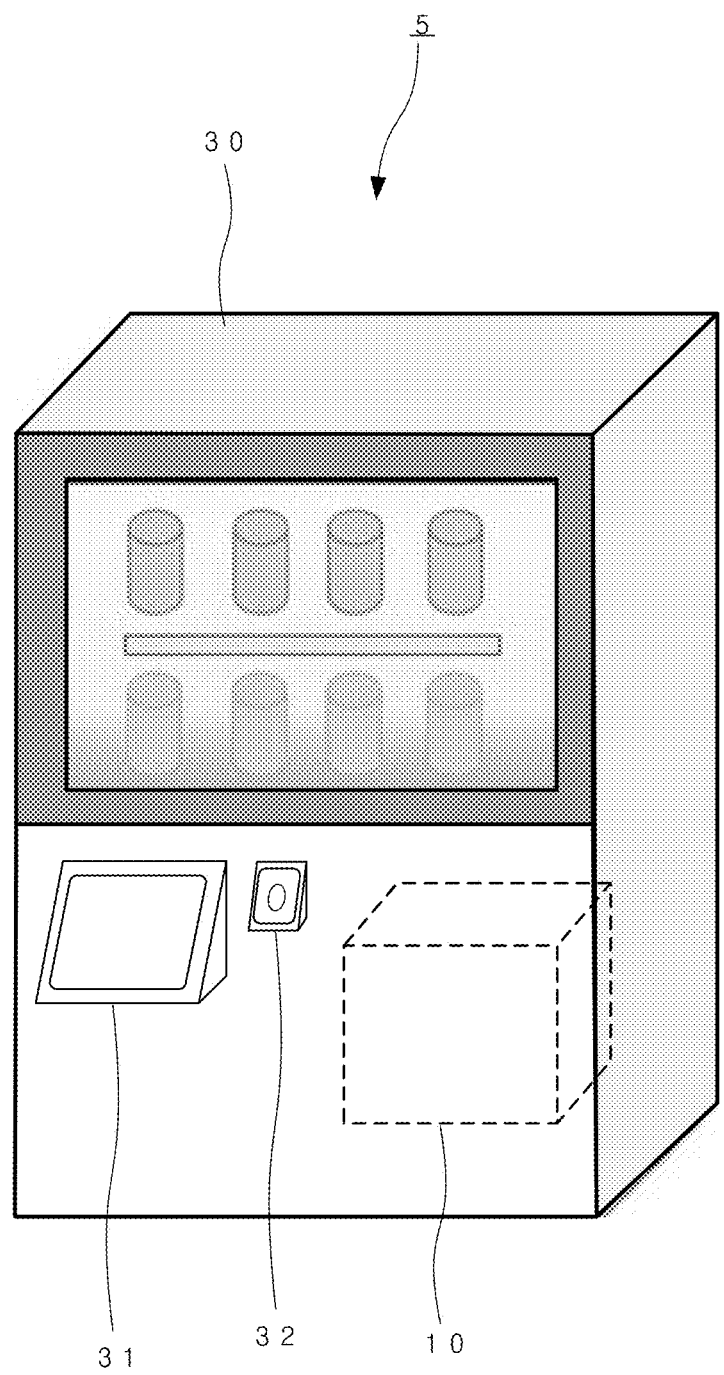
FIG. 1 is a view showing the electronic apparatus system including the window change control device according to the embodiment.

FIG. 1 shows the electronic apparatus system. 5 including the window change control device according to the embodiment. The electronic apparatus system 5 is a group of a plurality of types of electronic apparatuses. In this embodiment, the electronic apparatus system 5 comprises an image forming apparatus 10 and an automatic vending machine 30. The image forming apparatus 10 is incorporated into the casing of the automatic vending machine 30. The automatic vending machine 30 is referred to as the first electronic apparatus, and the image forming apparatus 10 is referred to as the second electronic apparatus.

The operation panel 31 for receiving various operations from a user and displaying various types of operation windows, guide windows and the like, is provided on the outer surface of the automatic vending machine 30, and is commonly used for the image forming apparatus 10 and the automatic vending machine 30. Similarly, the authentication unit 32 for identifying (authenticating) a user is also provided on the outer surface of the automatic vending machine 30 and is commonly used for the image forming apparatus 10 and the automatic vending machine 30. For example, the authentication unit 32 is a card reader using a short-range wireless communication, such as NFC (Near Field Communication) or the like, and identifies a user by reading the user information from an ID card of the user.

Figure 2:
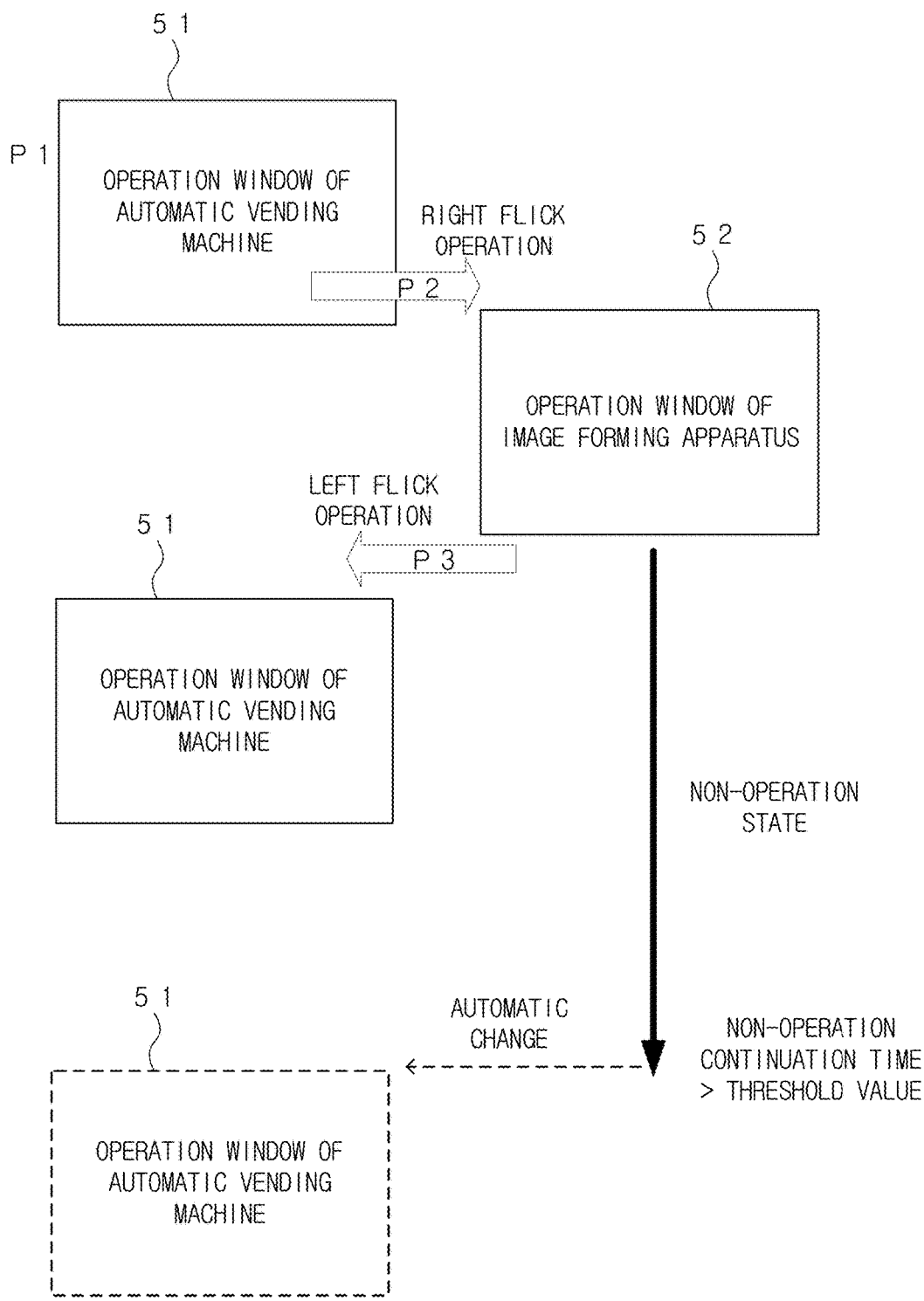
FIG. 2 is a view showing the change in the operation window displayed on the operation panel which is commonly used for the image forming apparatus and the automatic vending machine.

FIG. 2 shows the change in the operation window displayed on the operation panel 31 which is commonly used for the image forming apparatus 10 and the automatic vending machine 30. The default electronic apparatus of the electronic apparatus system 5 is the automatic vending machine 30 (first electronic apparatus). In the standby state, the first operation window 51 for using the automatic vending machine 30 is displayed on the operation panel 31 (P1). A user performs the operation for selecting and purchasing an article of the automatic vending machine 30 and the operation for refunding the charge via the first operation window 51.

When the electronic apparatus system 5 receives the predetermined window change operation, such as a right flick operation, from a user in the situation in which the first operation window 51 which is a default window is displayed on the operation panel 31 (referred to as the first state) (P2), the electronic apparatus system 5 changes the window displayed on the operation panel 31 to the second operation window 52 for using the image forming apparatus 10 (second electronic apparatus). The user can enter the job in the image forming apparatus 10 and perform the operation for inputting various types of setting via the second operation window 52.

When the electronic apparatus system 5 receives the predetermined window change operation, such as a left flick operation, from a user in the situation in which the second operation window 52 is displayed (referred to as the second state) (P3), the electronic apparatus system 5 changes the window displayed on the operation panel 31 to the first operation window 51.

In the second state in which the second operation window 52 is displayed, the time for which the operation is not received from a user (non-operation continuation time) is measured. When the non-operation continuation time exceeds the predetermined threshold value, the window displayed on the operation panel 31 is automatically changed to the default window (first operation window 51). In detail, until the next operation is received after the state of the operation panel 31 is changed from the first state in which the first operation window 51 is displayed on the operation panel 31 to the second state in which the second operation window 52 is displayed, the elapsed time which elapses since the state of the operation panel 31 is changed from the first state to the second state is measured as the non-operation continuation time. In case that any operation is received after the state of the operation panel 31 is changed to the second state, the elapsed time which elapses since the final operation is received is measured as the non-operation continuation time.

Further, the electronic apparatus system 5 has the function for changing the above threshold value in accordance with the use result of the automatic vending machine 30 (first electronic apparatus (default electronic apparatus)) and the image forming apparatus 10 (second electronic apparatus), in which one user uses the automatic vending machine 30 and the image forming apparatus 10 since the above user starts using the electronic apparatus system 5. When the threshold value is increased, it is hard to automatically change the displayed window from the second operation window 52 to the first operation window 51 due to the continuation of the non-operation state. On the other hand, when the threshold value is decreased, it is easy to automatically change the displayed window from the second operation window 52 to the first operation window 51 due to the continuation of the non-operation state.

In the electronic apparatus system 5 according to the embodiment, by changing the threshold value in accordance with the use result of the automatic vending machine 30 and the image forming apparatus 10, which is collected when the current user uses the electronic apparatus system 5, the changeability of the displayed window due to the continuation of the non-operation state is changed. Therefore, the user's convenience is improved by assisting the operation of the user who currently uses the electronic apparatus system 5 according to the user's situation. Further, the user is guided to the operation flow which is recommended by a system administrator or the like. The detail of the change in the threshold value will be explained later.

Figure 3:
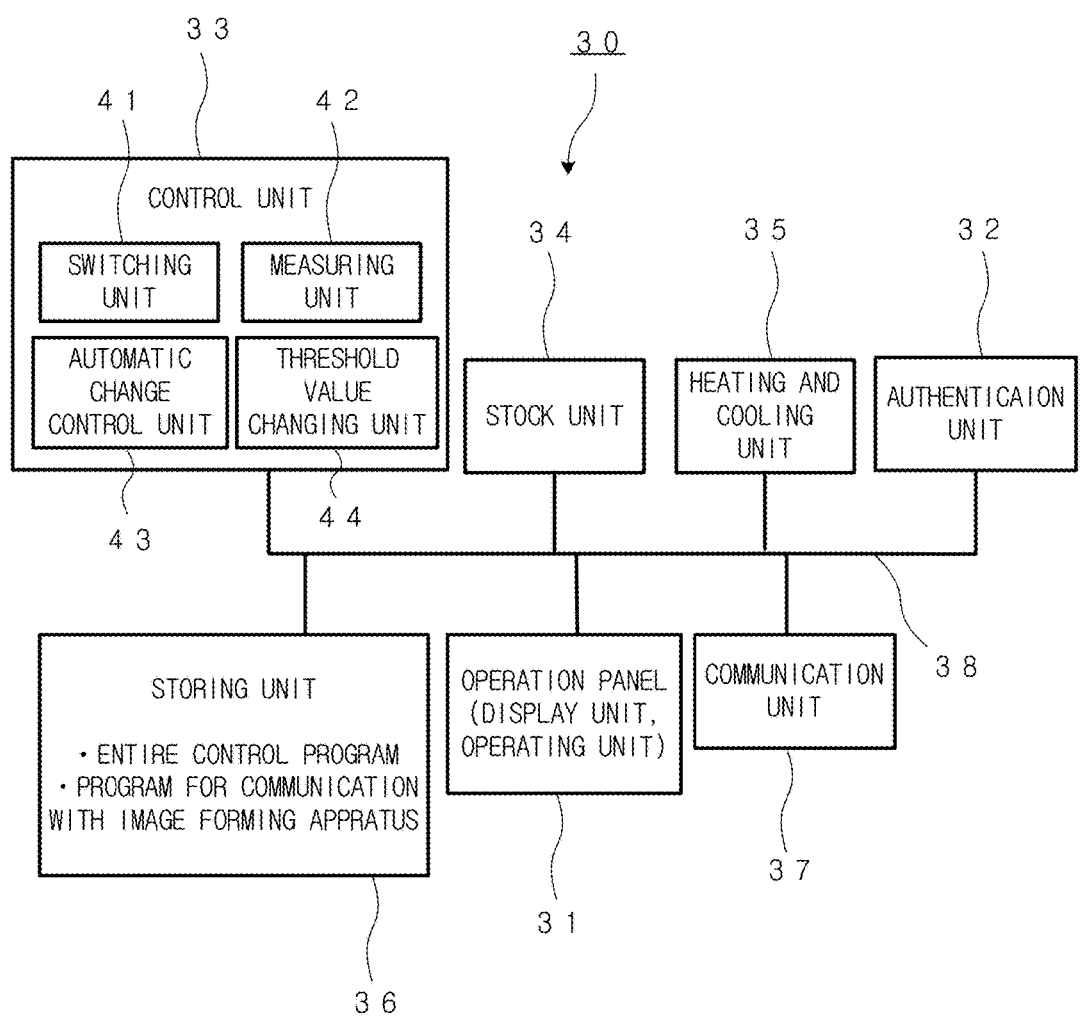
FIG. 3 is a block diagram showing the schematic configuration of the automatic vending machine in the electronic apparatus system.

FIG. 3 is a block diagram showing the schematic configuration of the automatic vending machine 30 in the electronic apparatus system 5. The automatic vending machine 30 comprises a control unit 33, a stock unit 34, a heating and cooling unit 35, a storing unit 36, a communication unit 37 and the like in accordance with the operation panel 31 and the authentication unit 32 which are described above. The above units are connected with each other so as to input and output various types of signals via the bus 38.

The control unit 33 comprises a CPU (Central Processing Unit) as a main unit. The control unit 33 operates in accordance with the programs stored in the storing unit 36. By the control unit 33, each unit of the automatic vending machine 30 is controlled, and the functions of the automatic vending machine 30 are realized.

The storing unit 36 comprises a ROM (Read Only Memory), a RAM (Random Access Memory), a hard disk drive and the like. In the ROM, various types of programs to be executed by the control unit 33 are stored. The RAM is used as a work memory for temporarily storing various data when the control unit 33 executes the programs. The hard disk drive is a large-capacity nonvolatile memory device. In the hard disk drive, various types of data are stored.

The communication unit 37 has the function for communicating with a server and various types of external devices by connecting with an external network via a wired or wireless communication, and for communicating with the image forming apparatus 10 in the casing of the automatic vending machine 30. In the electronic apparatus system 5, the automatic vending machine 30 is a main apparatus and the image forming apparatus 10 is a secondary apparatus. The operation panel 31 which is commonly used for the automatic vending machine 30 and the image forming apparatus 10 is controlled by the control unit 33 of the automatic vending machine 30.

In case that the control unit 33 instructs the operation panel 31 to function as the operation panel of the image forming apparatus 10, the operation panel 31 transmits the contents of the operation received from the user, to the image forming apparatus 10. Further, the operation panel 31 receives the information transmitted from the image forming apparatus 10 and changes the display contents of the operation panel 31 in accordance with the received information. The control unit 33 of the automatic vending machine 30 controls the change in the window between the first operation window 51 and the second operation window 52.

The operation panel 31 comprises a display unit, such as a liquid crystal display or the like, and an operating unit having a touch panel provided on the physical screen of the display unit, mechanical switches and the like. The touch panel detects the coordinate position on which the physical screen of the display unit is pressed down by using a touch pen, the user's finger or the like, and detects the flick operation, the drag operation and the like.

The authentication unit 32 comprises a reader using the NFC technology as described above. The authentication unit 32 may carry out the user authentication by using an optional method, such as a vein authentication or the like.

The stock unit 34 has the function for stocking the articles to be sold by the automatic vending machine 30, and for discharging the article to the outlet port in accordance with the instruction from the control unit 33.

The heating and cooling unit 35 is thermally connected with the stock unit 34, and heats or cools the articles stocked by the stock unit 34.

With respect to the window change, the control unit 33 has the function as the switching unit 41, a measuring unit 42, an automatic change control unit 43, a threshold value changing unit 44 and the like. The switching unit 41 switches the operation panel 31 between the first state in which the first operation window 51 is displayed and the second state in which the second operation window 52 is displayed, in accordance with the operation from the user. The measuring unit 42 measures the non-operation continuation time. The automatic change control unit 43 has the function for automatically changing the state of the operation panel 31 from the second state to the first state when the non-operation continuation time exceeds the threshold value in the second state. The threshold value changing unit 44 has the function for changing the threshold value in accordance with the use result of the first function and the second function, in which one user uses the automatic vending machine 30 and the image forming apparatus 10 since the above user starts using the electronic apparatus system 5.

Figure 4:
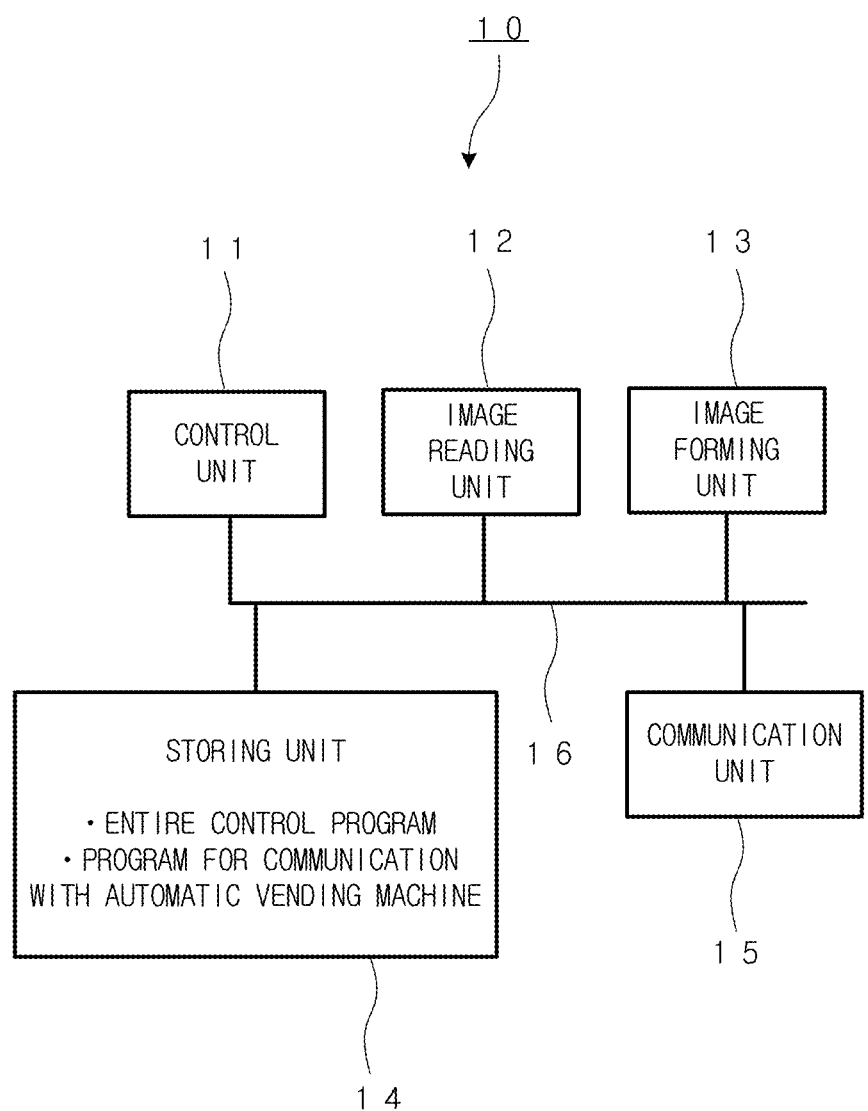
FIG. 4 is a block diagram showing the schematic configuration of the image forming apparatus in the electronic apparatus system.

FIG. 4 is a block diagram showing the schematic configuration of the image forming apparatus 10. The image forming apparatus 10 comprises a control unit 11 having a CPU as a main unit, an image reading unit 12, an image forming unit 13, a storing unit 14, a communication unit 15 and the like. The above units are connected so as to be communicable with each other via the bus 16.

The image forming apparatus 10 is a so-called multi function peripheral which has the function for executing jobs, such as a copy job for printing an image of an original on a recording sheet by optically reading the original, a scan job for storing the image data of the read original as a file and transmitting the image data to an external terminal via the network, a print job for printing out an image on a recording sheet in accordance with the print data read from a portable storing medium or received via the network, and the like.

By the control unit 11, a middleware, application programs and the like are executed on an OS (Operating System) program as a base.

The storing unit 14 comprises a ROM, a RAM, a hard disk drive and the like. In the storing unit 14, various types of programs are stored. By executing various types of processes by the control unit 11 in accordance with the stored programs, each function of the image forming apparatus 10 is realized. The storing unit 14 is used as a work memory for temporarily storing various data when the control unit 11 executes the process in accordance with the programs, an image memory for storing the image data, and the like.

The image reading unit 12 has the function for obtaining the image data by optically reading an original. For example, the image reading unit 12 comprises a light source for irradiating an original with light, a line image sensor for reading the original line by line in the width direction of the original by receiving the reflected light from the original, a moving unit for sequentially moving the reading position line by line in the longitudinal direction of the original, an optical system having lenses, mirrors and the like for guiding the reflected light from the original to the line image sensor and focusing the reflected light on the line image sensor, a converting unit for converting an analog image signal outputted from the line image sensor into digital image data, and the like.

The image forming unit 13 has the function for forming an image on the recording sheet in accordance with the image data. In this embodiment, the image forming unit 13 is configured as a so-called laser printer which comprises a conveying device for the recording sheet, a photoconductive drum, a charging device, a laser unit, a developing device, a transfer and separation device, a cleaning device and a fixing device, and which forms an image by the electrophotographic process. Alternatively, an image may be formed by another type of printer.

The communication unit 15 has the function for communicating with a server and various types of external devices by connecting with an external network via a wired or wireless communication, and for communicating with the automatic vending machine 30.

Next, the change in the threshold value to be compared with the non-operation continuation time will be explained.

FIGS. 5A to 5D are views showing the relation between the use result of the first electronic apparatus (automatic vending machine) and the second electronic apparatus (image forming apparatus 10) and the threshold value to be compared with the non-operation continuation time. In FIGS. 5A to 5D, the grayed part indicates the period for which the non-operation state is continued (non-operation continuation time). In FIGS. 5A to 5D, the first to the fourth cases are shown.

<First Case>

The first case shown in FIG. 5A is the case in which after the operation for executing the function of the first electronic apparatus (in the drawing, referred to as "FUNCTION 1") is received in the first state in which the first operation window 51 which is the operation window for the first electronic apparatus (automatic vending machine 30) is displayed, the state of the operation panel 31 is changed to the second state in which the second operation window 52 which is the operation window for the second electronic apparatus (image forming apparatus 10) is displayed, and then the operation for executing the function of the second electronic apparatus (in the drawing, referred to as "FUNCTION 2") is not received.

The threshold value is set to Ta. When the non-operation continuation time exceeds Ta, the state of the operation panel 31 is automatically changed from the second state to the first state. In the first case, because the state of the operation panel 31 is changed to the second state after the operation for executing the function of the first electronic apparatus is received, the need to return to the first state is low. Further, the operation for executing the function of the second electronic apparatus is not received. That is, a user wants to use the function of the second electronic apparatus, but there is some possibility that the non-operation state is continued because the user does not understand the method for using the function of the second electronic apparatus and is puzzled. Therefore, in the first case, in order to wait for the operation for using the function of the second electronic apparatus, the threshold value Ta is set the longest.

<Second Case>

The second case shown in FIG. 5B is the case in which the function of the operation panel 31 is changed to the second state without receiving the operation for executing the function of the first electronic apparatus (automatic vending machine 30) and then the operation for executing the function of the second electronic apparatus (image forming apparatus 10) is not received.

The threshold value is set to Tb which is shorter than Ta. When the non-operation continuation time exceeds Tb, the state of the operation panel 31 is automatically changed from the second state to the first state. In the second case, because the state of the operation panel 31 is changed to the second state without receiving the operation for executing the function of the first electronic apparatus which is the default electronic apparatus, there is a request for returning to the first state in which the operation for the default electronic apparatus is received. In order to satisfy the above request, the threshold value is preferably set shortly. On the other hand, because the operation for executing the function of the second electronic apparatus is not received, a user wants to use the function of the second electronic apparatus, but there is some possibility that the non-operation state is continued because the user does not understand the method for using the function of the second electronic apparatus and is puzzled. In order to satisfy this request, the threshold value is preferably set long. Therefore, in the second case, in consideration of the above two contrary requests, the threshold value Tb is set so as to be the second longest among four cases.

<Third Case>

The third case shown in FIG. 5C is the case in which after the operation for executing the function of the first electronic apparatus is received in the first state in which the first operation window 51 which is the operation window for the first electronic apparatus (automatic vending machine 30) is displayed, the state of the operation panel 31 is changed to the second state in which the second operation window 52 which is the operation window for the second electronic apparatus (image forming apparatus 10) is displayed, and then the operation for executing the function of the second electronic apparatus is received.

The threshold value is set to Tc which is shorter than Tb. When the non-operation continuation time exceeds Tc, the state of the operation panel 31 is automatically changed from the second state to the first state. In the third case, because the state of the operation panel 31 is changed to the second state after the operation for executing the function of the first electronic apparatus is received, the need to return to the first state is low. However, because the operation for executing the function of the second electronic apparatus is already received, there is no reason why the operation panel 31 stays in the second state. In this case, there is high possibility that a user finishes using all of the necessary functions and leaves the electronic apparatus system 5. Therefore, in the third case, the threshold value Tc is shorter than Ta and Tb, and is set so as to be the third longest among four cases.

<Fourth Case>

The fourth case shown in FIG. 5D is the case in which the state of the operation panel 31 is changed to the second state without receiving the operation for executing the function of the first electronic apparatus (automatic vending machine 30) and then the operation for executing the function of the second electronic apparatus (image forming apparatus 10) is received.

The threshold value is set to Td which is the shortest among four cases. When the non-operation continuation time exceeds Td, the state of the operation panel 31 is automatically changed from the second state to the first state. In the fourth case, because the state of the operation panel 31 is changed to the second state without receiving the operation for executing the function of the first electronic apparatus, there is a request for returning to the first state corresponding to the first electronic apparatus which is the default electronic apparatus. Further, because the operation for executing the function of the second electronic apparatus is already received, there is no reason why the operation panel 31 stays in the second state. Therefore, in the fourth case, in order to proactively returning from the second state to the first state soon, the threshold value Td is set so as to be the shortest among four cases.

In the above four cases, the setting of the threshold value is changed based on the following two rules.

(1) In case that the function of the first electronic apparatus is used, the threshold value is increased. That is, in case that the state of the operation panel 31 is changed from the first state to the second state after the function of the first electronic apparatus is used, the threshold value is set so as to be large as compared with the case in which the state of the operation panel 31 is changed from the first state to the second state without using the function of the first electronic apparatus.

(2) In case that the function of the second electronic apparatus is used, the threshold value is decreased. That is, in case that the function of the second electronic apparatus has been used, the threshold value is set so as to be small as compared with the case in which the function of the second electronic apparatus is not used.

With respect to the above rule (1), in case that the function of the first electronic apparatus has been used, the need to automatically change the state of the operation panel 31 from the second state to the first state due to the continuation of the non-operation state is low as compared with the case in which the function of the first electronic apparatus is not used. Further, in case that the function of the first electronic apparatus which is the default electronic apparatus is not used, in order to urge the user to use the function of the first electronic apparatus, it is necessary to automatically change the state of the operation panel 31 from the second state to the first state due to the continuation of the non-operation state soon as compared with the case in which the function of the first electronic apparatus has been used.

With respect to the above rule (2), in case that the function of the second electronic apparatus has been used, the need to stay in the second state is low as compared with the function of the second electronic apparatus is not used.

Figure 6:
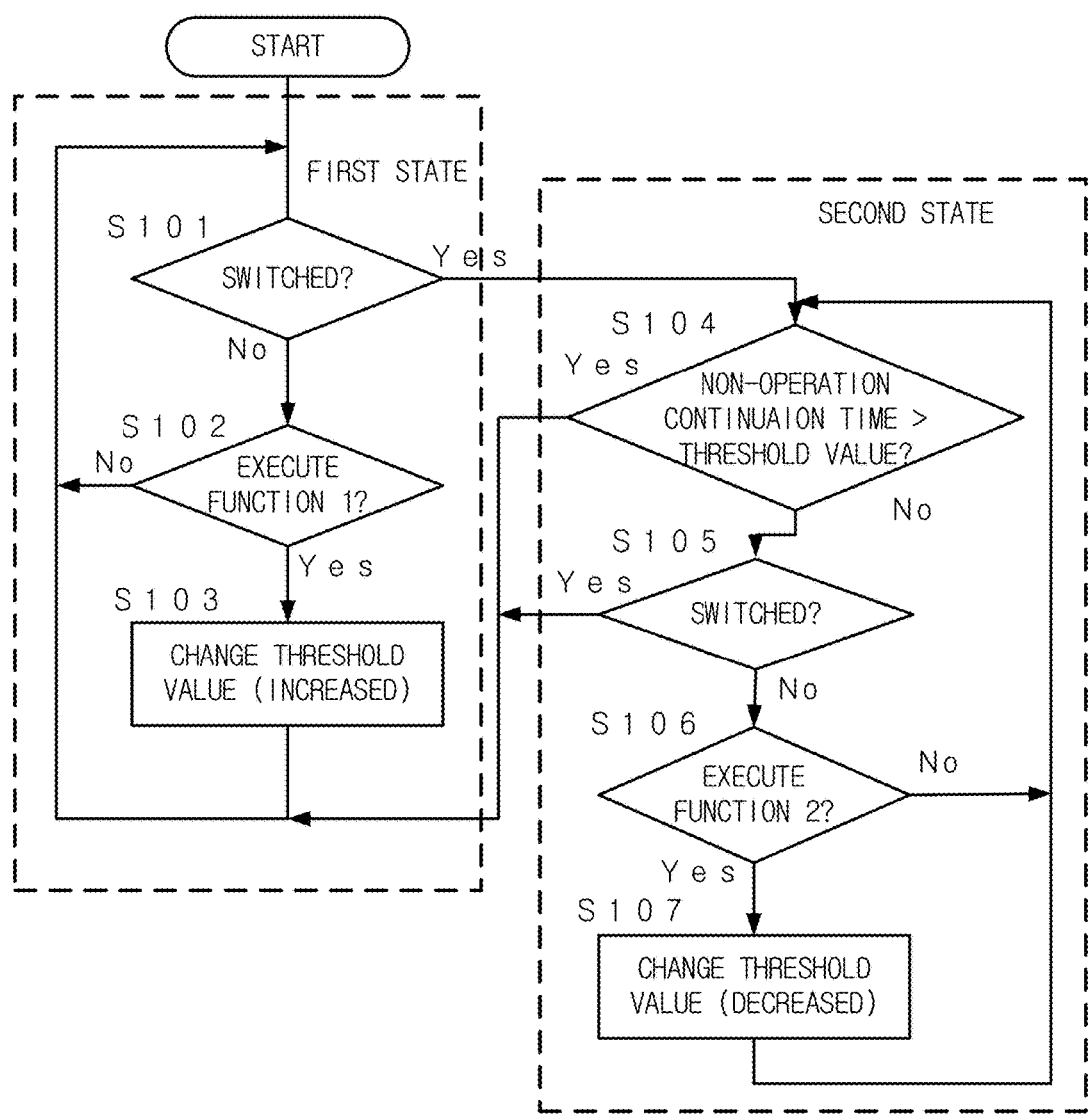
FIG. 6 is a flowchart showing the process for changing the threshold value to be compared with the non-operation continuation time.

FIG. 6 shows the flowchart of the process for changing the threshold value in accordance with the above two rules. Initially, the state of the operation panel 31 is set to the first state in which the first operation window 51 for using the function of the first electronic apparatus (automatic vending machine 30) is displayed. It is checked whether the switching operation for switching the state of the operation panel 31 to the second state in which the second operation window 52 for using the function of the second electronic apparatus (image forming apparatus 10) is displayed, is received from a user (Step S101). In case that the switching operation is not received (Step S101; No), it is determined whether the operation for executing the function of the first electronic apparatus (the operation for using the automatic vending machine 30) is received from a user (Step S102).

In case that the operation for executing the function of the first electronic apparatus is not received (Step S102; No), the process returns to Step S101. When the operation for executing the function of the first electronic apparatus is received (Step S102; Yes), the threshold value is increased (Step S103). Then, the process returns to Step S101.

When the switching operation for switching the state of the operation panel 31 to the second state is received from a user (Step S101; Yes), the state of the operation panel 31 is changed to the second state. Then, the measurement of the non-operation continuation time is started, and it is determined whether the non-operation continuation time exceeds the threshold value (Step S104). In case that Step S103 is executed, that is, in case that the operation for executing the function of the first electronic apparatus has been received, the threshold value is increased from the initial value.

In case that the non-operation continuation time exceeds the threshold value (Step S104; Yes), the state of the operation panel 31 is changed to the first state. Then, the process returns to Step S101. In case that the non-operation continuation time does not exceed the threshold value (Step S104; No), it is checked whether the switching operation for switching the state of the operation panel 31 to the first state is received from a user (Step S105). When the above switching operation is received (Step S105; Yes), the state of the operation panel 31 is changed to the first state. Then, the process returns to Step S101.

In case that the switching operation for switching the state of the operation panel 31 to the first state is not received from a user (Step S105; No), it is determined whether the operation for executing the function of the second electronic apparatus (the operation for using the image forming apparatus 10) is received from a user (Step S106).

In case that the operation for executing the function of the second electronic apparatus is not received (Step S106; No), the process returns to Step S104. When the operation for executing the function of the second electronic apparatus is received (Step S106; Yes), the threshold value is decreased (Step S107). Then, the process returns to Step S104. Therefore, in Step S104 which is executed after Step S107, the non-operation continuation time is compared with the threshold value which is smaller than the threshold value which is set before the operation for executing the function of the second electronic apparatus is received.

As shown in FIGS. 5A to 5D, when the order of the length of the threshold value in the above four cases is defined, for example, the threshold value may be changed as follows.

Figure 7:
FIG. 7 is a view showing an example of the threshold table.

As shown in FIG. 7, the threshold value table 60 in which the threshold values corresponding to four cases defined by the use result of the function of the first electronic apparatus and the function of the second electronic apparatus are previously registered, is prepared. Then, in Step S104 shown in FIG. 6, the threshold value corresponding to the current use result (used/unused) of the function of the first electronic apparatus (automatic vending machine 30) and the function of the second electronic apparatus (image forming apparatus 10) is obtained from the threshold value table 60. The obtained threshold value is compared with the non-operation continuation time.

In this case, in Step S103, only the condition "the function of the first electronic apparatus has been used" is registered. In Step S107, only the condition "the function of the second electronic apparatus has been used" is registered. Then, in Step S104, by recognizing the use result of the function of the first electronic apparatus and the function of the second electronic apparatus in accordance with the registered conditions, the threshold value table 60 is referred.

In case that a user who uses the electronic apparatus system 5 is changed before the non-operation continuation time exceeds the threshold value, the window displayed on the operation panel 31 is automatically changed to the default window immediately regardless of the non-operation continuation time. Further, when one user finishes using the electronic apparatus system 5 or when a user is changed, the threshold value is reset to the initial value.

The setting of the initial value of the threshold value can be changed by an administrator or the like.

Further, the degree of the change in the threshold value can be changed by an administrator or the like. For example, in Step S103 or Step S107 shown in FIG. 6, the degree of the increase or decrease in the threshold value can be changed. Alternatively, each value of Ta to Td registered in the threshold value table 60 shown in FIG. 7 can be optionally set and changed.

Next, the case in which the state of the operation panel 31 is changed to the predetermined third state when the non-operation state is continued for the predetermined time or more in the first state in which the first operation window 51 for using the function of the first electronic apparatus (automatic vending machine 30) is displayed, will be explained.

The third state includes, for example, the energy saving state in which the display unit of the operation panel 31 is turned off, the state in which the home window is displayed, and the like. In this case, the third state is the energy saving state.

Figure 8:
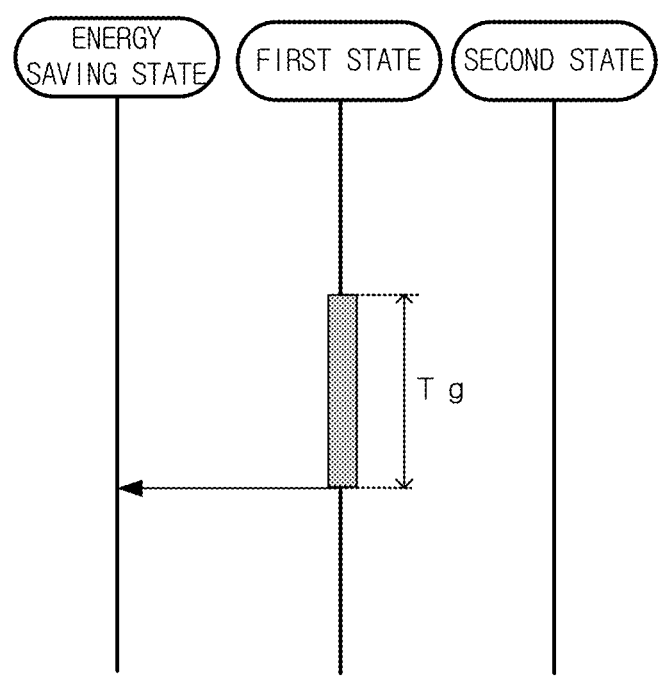
FIG. 8 is a sequence diagram showing the situation in which when the non-operation state is continued in the first state for the predetermined time or more, the state of the operation panel is changed from the first state to the energy saving state.

FIG. 8 is a sequence diagram showing the situation in which the non-operation state is continued for the predetermined time Tg or more in the first state in which the first operation window 51 for using the function of the first electronic apparatus is displayed. In this case, when the non-operation continuation time exceeds Tg, the state of the operation panel 31 is automatically changed to the energy saving state.

Figure 9:
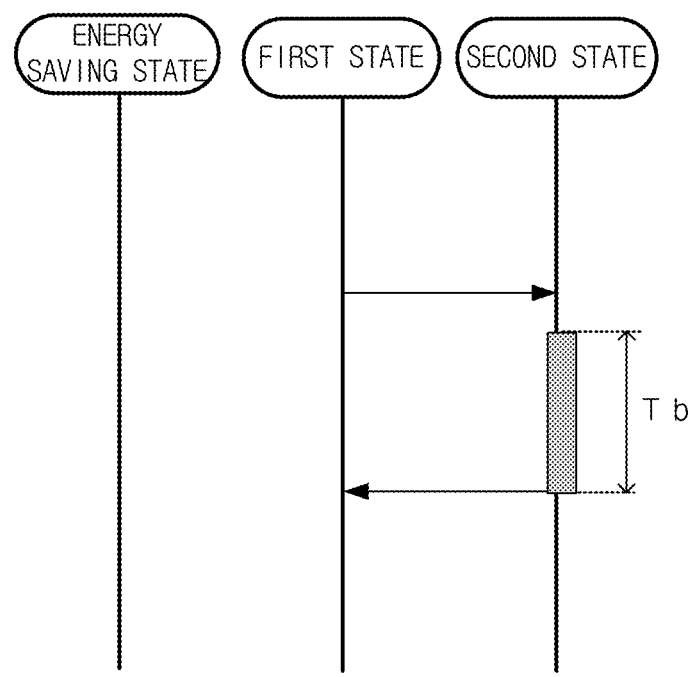
FIG. 9 is a sequence diagram showing the situation in which the state of the operation panel is changed from the first state to the second state without using the function of the first electronic apparatus and then the non-operation continuation time exceeds the threshold value.

FIG. 9 is a sequence diagram showing the situation in which the state of the operation panel 31 is changed from the first state to the second state without using the function of the first electronic apparatus and then the non-operation continuation time exceeds the threshold value Tb. In this case, the state of the operation panel 31 is automatically changed from the second state to the first state.

Figure 10:
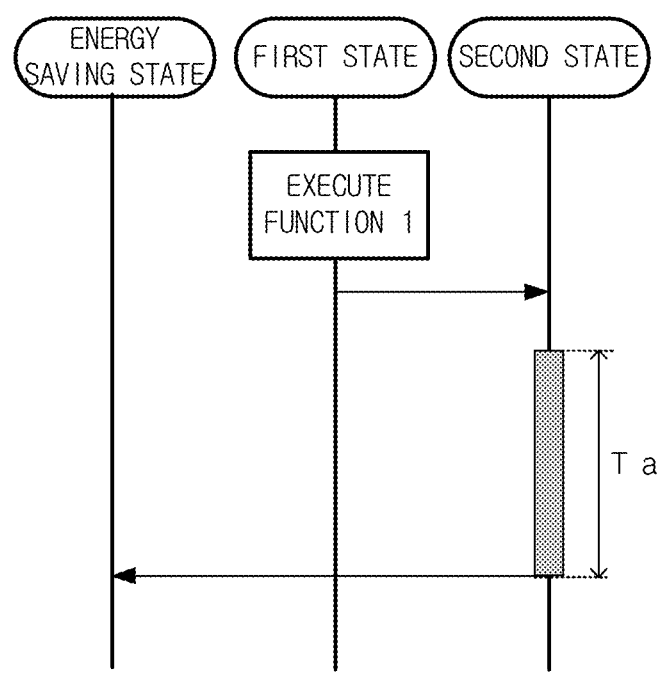
FIG. 10 is a sequence diagram showing the situation in which the state of the operation panel is changed from the first state to the second state after the function of the first electronic apparatus is used, and then the non-operation continuation time exceeds the threshold value.

FIG. 10 is a sequence diagram showing the situation in which the state of the operation panel 31 is changed from the first state to the second state after the function of the first electronic apparatus is used, and then the non-operation continuation time exceeds the threshold value Ta. In this case, the state of the operation panel 31 is not automatically changed from the second state to the first state, but is directly changed from the second state to the energy saving state. That is, in case that the function of the first electronic apparatus has been used, it is not necessary to change the state of the operation panel 31 to the first state in which the first operation window 51 for using the function of the first electronic apparatus is displayed. Therefore, the state of the operation panel 31 is directly changed to the energy saving state.

In the configuration for automatically changing the state of the operation panel 31 to the energy saving state in case that the non-operation state is continued for the predetermined time or more in the first state, in case that the function of the first electronic apparatus has been used, even if the non-operation continuation time exceeds the threshold value and the state of the operation panel 31 is automatically changed from the second state to the first state, there is high possibility that the non-operation state is further continued for the predetermined time or more in the first state. As a result, the state of the operation panel 31 is further automatically changed from the first state to the third state. Therefore, in case that the function of the first electronic apparatus has been used, the state of the operation panel 31 is directly changed from the second state to the third state due to the continuation of the non-operation state. As a result, as compared with the case in which the state of the operation panel 31 is changed to the third state via the first state, it is possible to eliminate the unnecessary standby time in the first state and to change the state of the operation panel 31 to the energy saving state soon.

Next, the case in which when the use order of a plurality of electronic apparatuses is previously set by an administrator or the like, a user is guided so as to use the electronic apparatus system 5 in accordance with the set use order by using the automatic change function for changing the state of the operation panel 31 due to the continuation of the non-operation state, will be explained. The use order can be optionally set and changed by an administrator or the like.

For example, in case that the change in the state of the operation panel 31 from the first state to the second state in accordance with the user's operation is not matched with the set use order, the threshold value to be compared with the non-operation continuation time is set so as to be short as compared with the case in which the operation flow is matched with the set use order. Specifically, in case that the use order of the electronic apparatuses is set to the first electronic apparatus (automatic vending machine 30) and the second electronic apparatus (image forming apparatus 10) in order, when the state of the operation panel 31 is changed to the second state without using the function of the first electronic apparatus, there is some possibility that the second electronic apparatus is used prior to the first electronic apparatus. Therefore, the threshold value is set so as to be short as compared with the case in which the state of the operation panel 31 is changed to the second state after the function of the first electronic apparatus is used. This setting of the threshold value corresponds to the first case and the second case shown in FIGS. 5A and 5B, respectively. In the second case, a user is guided so as to use the first electronic apparatus prior to the second electronic apparatus.

Other examples relating to the guide of a user are shown in FIGS. 11 to 15. In these examples, the operation panel 31 has the third state in which the operation window for using the third electronic apparatus is displayed, in addition to the first state and the second state. Further, the state of the operation panel 31 can be changed to the second state or the third state from only the first state. For example, the state of the operation panel 31 cannot be directly changed from the second state to the third state. The set use order is the first electronic apparatus, the second electronic apparatus and the third electronic apparatus in order. The threshold value to be compared with the non-operation continuation time is set to Tr or Tf. The threshold values Tr and Tf have the different values, and the inequality Tf<Tr is satisfied.

Figure 11:
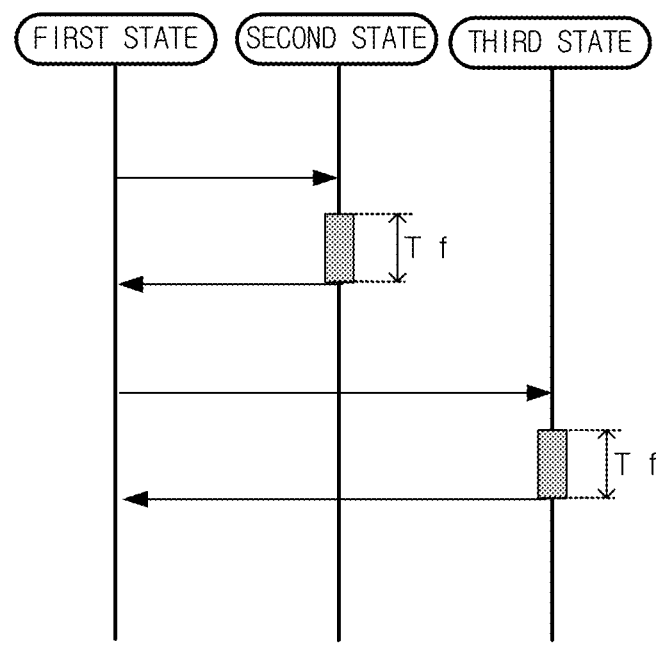
FIG. 11 is a sequence diagram showing the case in which a user is guided so as to match the set use order, and in which the state of the operation panel is changed to the second state or the third state without using the function of the first electronic apparatus.

FIG. 11 shows the case in which a user changes the state of the operation panel 31 to the second state or the third state before the function of the first electronic apparatus is used. In this case, the user's operation is not matched with the set use order. Therefore, the threshold value to be compared with the non-operation continuation time is changed to Tf (small). As a result, a user is guided by returning to the first state.

Figure 12:
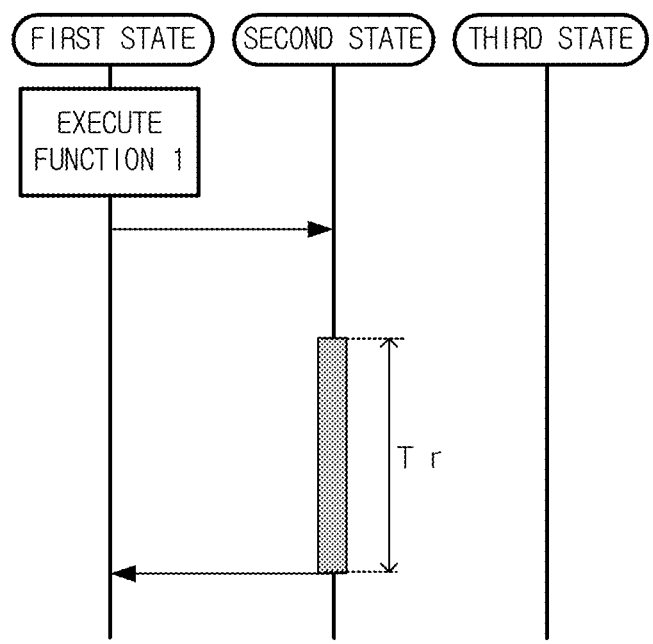
FIG. 12 is a sequence diagram showing the case in which a user is guided so as to match the set use order, and in which the state of the operation panel is changed from the first state to the second state after the function of the first electronic apparatus is used, and then the operation for executing the function of the second electronic apparatus is not received.

FIG. 12 shows the case in which the state of the operation panel 31 is changed to the second state after the function of the first electronic apparatus is used, and then the operation for executing the function of the second electronic apparatus is not received. In this case, because the user's operation which is matched with the set use order is performed, the threshold value is changed to Tr (large). As a result, it is hard to automatically change the state of the operation panel 31 to the first state due to the continuation of the non-operation state, and a use is guided so as to use the function of the second electronic apparatus.

Figure 13:
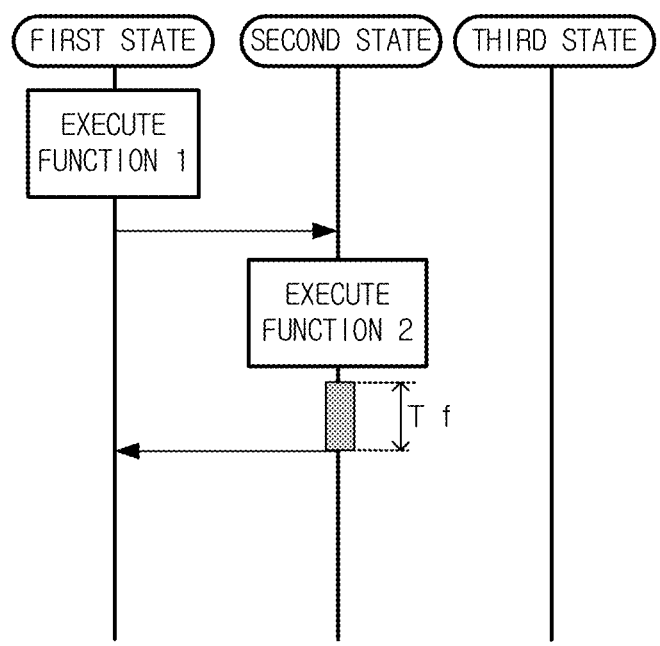
FIG. 13 is a sequence diagram showing the case in which a user is guided so as to match the set use order, and in which the state of the operation panel is changed from the first state to the second state after the function of the first electronic apparatus is used, and then the operation for executing the function of the second electronic apparatus is received.

FIG. 13 shows the case in which the state of the operation panel 31 is changed to the second state after the function of the first electronic apparatus is used, and then the operation for executing the function of the second electronic apparatus is received. In this case, the threshold value is changed to Tf (small). As a result, the state of the operation panel 31 easily returns to the first state due to the continuation of the non-operation state, and a user is guided so as to change the state of the operation panel 31 from the first state to the third state.

Figure 14:
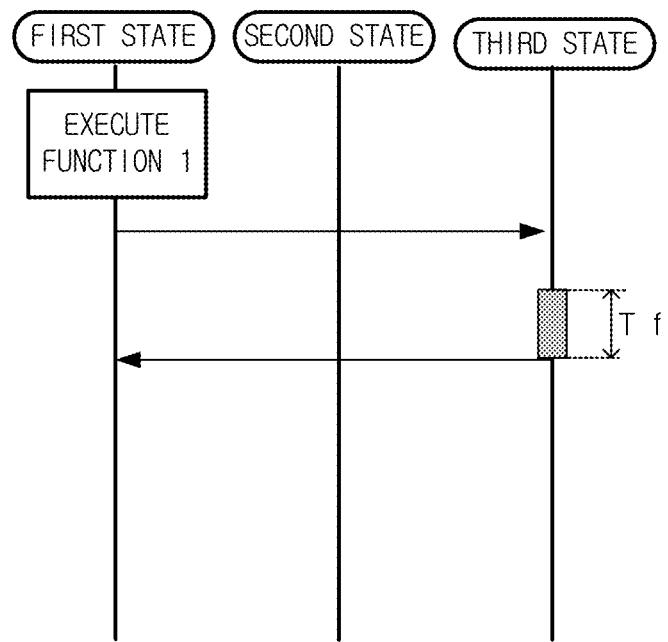
FIG. 14 is a sequence diagram showing the case in which a user is guided so as to match the set use order, and in which the state of the operation panel is changed from the first state to the third state after the function of the first electronic apparatus is used.

FIG. 14 shows the case in which the state of the operation panel 31 is changed to the third state after the function of the first electronic apparatus is used. In this case, because the user's operation is not matched with the set use order, the threshold value is changed to Tf (small). As a result, the state of the operation panel 31 easily returns to the first state due to the continuation of the non-operation state.

Figure 15:
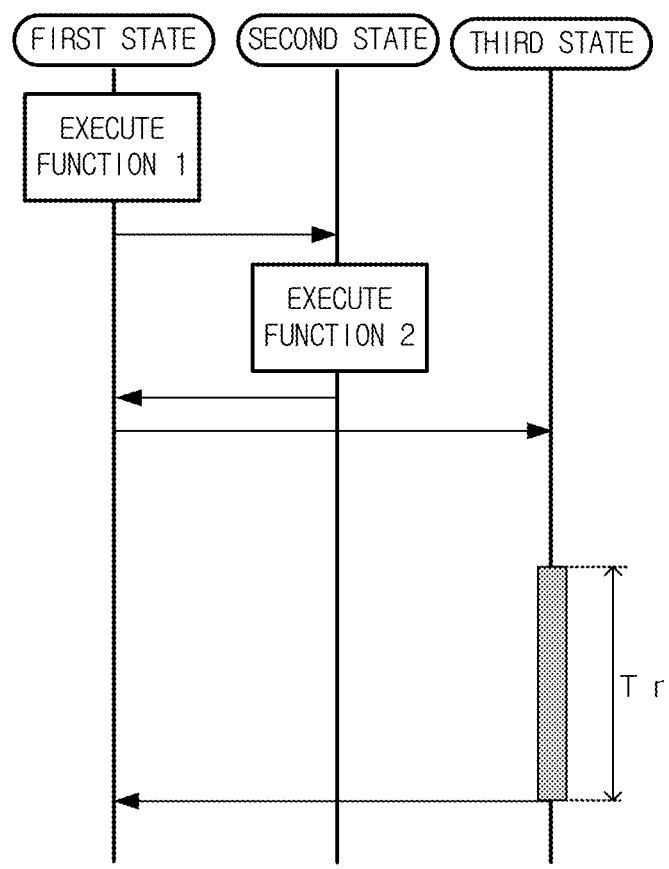
FIG. 15 is a sequence diagram showing the case in which a user is guided so as to match the set use order, and in which the state of the operation panel is changed from the first state to the third state after the function of the first electronic apparatus and the function of the second electronic apparatus are used.

FIG. 15 shows the case in which the state of the operation panel 31 is changed to the third state after the function of the first electronic apparatus and the function of the second electronic apparatus are used in order. In this case, because the user's operation is matched with the set use order, the threshold value is set to Tr (large). As a result, it is hard to automatically change the state of the operation panel 31 to the first state due to the continuation of the non-operation state, and a user is guided so as to use the function of the third electronic apparatus by staying in the third state.

Figure 16:
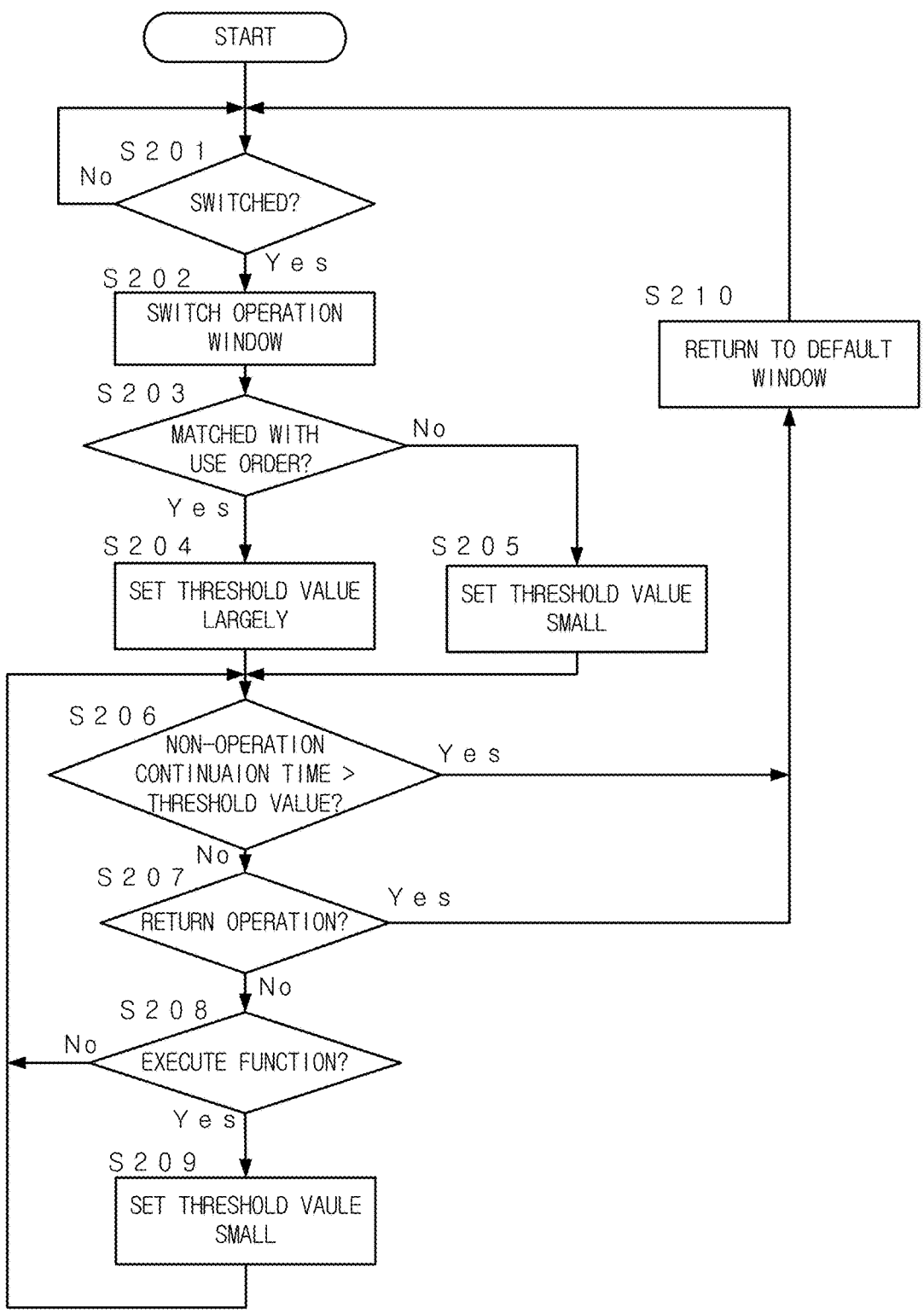
FIG. 16 is a flowchart showing the process for changing the threshold value so as to guide a user in accordance with the set use order.

FIG. 16 shows the flow of the process for changing the threshold value so as to guide a user in accordance with the set use order. Initially, the default window is displayed. When the switching operation for switching the operation window is received from a user (Step S201; Yes), the operation window is switched in accordance with the switching operation (Step S202). Then, it is determined whether the above switching operation is matched with the use order of the electronic apparatuses, which is previously set (Step S203).

In case that the switching operation is matched with the set use order (Step S203; Yes), the threshold value is set to Tr (large) (Step S204). Then, the process proceeds to Step S206. In case that the switching operation is not matched with the set use order (Step S203; No), the threshold value is set to Tf (small) (Step S205). Then, the process proceeds to Step S206.

In Step S206, it is checked whether the non-operation continuation time exceeds the threshold value. When the non-operation continuation time exceeds the threshold value (Step S206; Yes), the operation window is automatically changed to the default window (Step S210). Then, the process returns to Step S201.

Incase that the non-operation continuation time does not exceed the threshold value (Step S206; No), it is checked whether the return operation for returning to the previous operation window is received from a user (Step S207). When the return operation is received (Step S207; Yes), the operation window is changed to the default window (Step S210) and the process returns to Step S201.

In case that the return operation is not received (Step S207; No), it is checked whether the operation for executing the function of the electronic apparatus corresponding to the current operation window is received via the current operation window (Step S208). When the operation for executing the function is received (Step S208; Yes), the threshold value is set to Tf (small) (Step S209) and the process returns to Step S206. In case that the operation for executing the function is not received (Step S208; No), the process returns to Step S206 and is continued.

As described above, in this embodiment, by using the function for automatically changing the window due to the continuation of the non-operation state, the user's convenience can be improved and the user can be guided to the operation flow which is recommended by a system administrator or the like.

For example, in case that a user who changes the operation window from the operation window for using the function of the default electronic apparatus to the operation window for using the function of another electronic apparatus in error, searches the operation method for returning to the default window and is puzzled and the non-operation state is continued, the threshold value is changed shortly. As a result, the operation window returns to the default window due to the non-operation state which is continued for a short time. It is possible to assist a user who does not understand the return operation for returning to the default window and is puzzled.

Further, in case that a user changes the window in order to use another electronic apparatus, however, the user does not understand the method for using the electronic apparatus and is puzzled and the non-operation state is continued, the threshold value is changed long. As a result, the operation window is not automatically changed to the default window due to the non-operation state which is continued for a short time. Therefore, it is possible to prevent the user's convenience from being decreased by automatically changing the window to the default window against the user's intention while the user is puzzled about the method for using the electronic apparatus.

As described above, the embodiment is explained by using the drawings. However, in the present invention, the concrete configuration is not limited to the above embodiment. In the present invention, various modifications of the above embodiment or the addition of various functions or the like to the embodiment can be carried out without departing from the gist of the invention.

The first electronic apparatus and the second electronic apparatus are not limited to the apparatuses disclosed in the embodiment, and may be optional electronic apparatuses. Further, in the embodiment, the first electronic apparatus is the default electronic apparatus, and the first operation window 51 for using the first electronic apparatus is the operation window which is displayed as a default. However, in case that the state of the operation panel 31 is changed from the first state in which the first operation window 51 is displayed to the second state in which the second operation window 52 is displayed, and the non-operation state is continued in the second operation window 52 for the time corresponding to the threshold value or more, the state of the operation panel 31 may be automatically changed to the first state. The first electronic apparatus is not limited to the default electronic apparatus, and the first operation window 51 is not limited to the default window. Further, the electronic apparatus system 5 may have three or more electronic apparatuses.

The technology disclosed in the embodiment may be applied to the window change control device which is obtained by extracting the function for automatically changing the window displayed on the operation panel 31, from the electronic apparatus system 5.

One of the objects of the above embodiment is to provide a window change control method, a window change control device and a non-transitory computer-readable recording medium which can improve the user's convenience and guide a user to the operation flow which is recommended by a system administrator or the like, by using the function for automatically changing the window due to the continuation of the non-operation state.

In the embodiment, in case that after the state of the operation panel is changed from the first state in which the first operation window for using the first electronic apparatus is displayed to the second state in which the second operation window for using the second electronic apparatus is displayed, the non-operation continuation time exceeds the threshold value, the state of the operation panel is automatically changed from the second state to the first state. Further, the threshold value is changed in accordance with the use result of the first electronic apparatus and the second electronic apparatus.

In this embodiment, when the first electronic apparatus is used, the need to change the state of the operation panel from the second state to the first state is low. Therefore, the threshold value is increased in order to be hard to automatically change the state of the operation panel from the second state to the first state due to the continuation of the non-operation state.

In this embodiment, when the second electronic apparatus is used, the need to stay in the second state is low. Therefore, the threshold value is decreased in order to be easy to automatically change the state of the operation panel from the second state to the first state due to the continuation of the non-operation state.

In this embodiment, the electronic apparatus which is used as a default is the electronic apparatus which the manufacturer of the electronic apparatuses wants the user to preferentially use, and may be referred as a main electronic apparatus.

In this embodiment, when the state of the operation panel is changed from the first state to the second state without using the default electronic apparatus, the threshold value is set shortly as compared with the case in which the state of the operation panel is changed from the first state to the second state after the default electronic apparatus is used. Thereby, the user is guided so as to use the default electronic apparatus.

In this embodiment, in case that the default electronic apparatus and the second electronic apparatus have been used, there is high possibility that a user has already left the electronic apparatus. On the other hand, in case that neither of the default electronic apparatus nor the second electronic apparatus is used, a user wants to use the second electronic apparatus, but there is some possibility that the user is puzzled about the method for using the second electronic apparatus. Therefore, in the former case, the threshold value is set shortly as compared with the latter case. Thereby, the operation window is changed to the default window soon, and the operation panel can be ready for the use of the electronic apparatus system by the next user.

In this embodiment, in case that the second electronic apparatus has been used, because it is not necessary to stay in the second state, the threshold value is set shortly. At this time, when the case in which the first electronic apparatus is not used is compared with the case in which the first electronic apparatus has been used, it is considered that the need to return to the first state in case that the first electronic apparatus is not used is high as compared with the case in which the first electronic apparatus has been used. Therefore, in case that the second electronic apparatus has been used, when the first electronic apparatus is not used, the threshold value is set shortly as compared with the case in which the first electronic apparatus has been used.

In this embodiment, when a user is changed, the operation window is immediately changed to the default window regardless of the continuation time of the non-operation state in order to be ready for the use of the electronic apparatus system by the next user soon.

In this embodiment, in the configuration for automatically changing the state of the operation panel to the third state in case that the non-operation state is continued for the predetermined time or more in the first state, when the first electronic apparatus has been used, even if the state of the operation panel is automatically changed from the second state to the first state due to the continuation of the non-operation state, there is high possibility that the non-operation state is further continued for the predetermined time or more in the first state. As a result, the state of the operation panel is further automatically changed from the first state to the third state. Therefore, the state of the operation panel is directly changed from the second state to the third state due to the continuation of the non-operation state. As a result, as compared with the case in which the state of the operation panel is changed to the third state via the first state, it is possible to eliminate the unnecessary standby time in the first state.

In this embodiment, by using the function for automatically changing the state of the operation panel due to the continuation of the non-operation state, a user is guided so as to match the set use order.

According to the window change control method, the window change control device and the non-transitory computer-readable recording medium, it is possible to improve the user's convenience and to guide a user to the operation flow which is recommended by a system administrator or the like, by using the function for automatically changing the window due to the continuation of the non-operation state.

The present U.S. patent application claims the priority of Japanese Patent Application No. 2015-190816, filed on Sep. 29, 2015, according to the Paris Convention, and the entirety of which is incorporated herein by reference for correction of incorrect translation.

What is claimed is:

1. A window change control method for controlling a change in a window displayed on an operation panel which is commonly used for displaying a first operation window for using a first electronic apparatus and for displaying a second operation window for using a second electronic apparatus, the method comprising:
 changing a state of the operation panel from a first state in which the first operation window is displayed to a second state in which the second operation window is displayed, responsive to a user's operation;
 measuring a first elapsed time until a next operation is received after the state of the operation panel is changed from the first state to the second state, the first elapsed time elapsing since the state of the operation panel is changed from the first state to the second state, or a second elapsed time when any operation is received after the state of the operation panel is changed to the second state, the second elapsed time elapsing since a final operation is received, as a non-operation continuation time;
 automatically changing the state of the operation panel from the second state to the first state when the non-operation continuation time exceeds a threshold value; and
 changing the threshold value in accordance with a use result of the first electronic apparatus and the second electronic apparatus, in which the user uses the first electronic apparatus and/or the second electronic apparatus since the user starts using the first electronic apparatus or the second electronic apparatus.

2. The window change control method of claim 1, wherein in the changing of the threshold value, the threshold value is increased when the first electronic apparatus is used.

3. The window change control method of claim 1, wherein in the changing of the threshold value, the threshold value is decreased when the second electronic apparatus is used.

4. The window change control method of claim 1, wherein the first electronic apparatus is an electronic apparatus which is used as a default.

5. The window change control method of claim 1, wherein in the changing of the threshold value, when the state of the operation panel is changed to the second state without using the first electronic apparatus which is an electronic apparatus to be used as a default, the threshold value is set shortly as compared with a case in which the state of the operation panel is changed to the second state after the first electronic apparatus is used.

6. The window change control method of claim 1, wherein in the changing of the threshold value, when the state of the operation panel is changed to the second state after the first electronic apparatus which is an electronic apparatus to be used as a default is used and then the second electronic apparatus is used, the threshold value is set shortly as compared with a case in which the state of the operation panel is changed to the second state without using the first electronic apparatus and then the second electronic apparatus is not used.

7. The window change control method of claim 1, wherein in the changing of the threshold value, when the state of the operation panel is changed to the second state without using the first electronic apparatus which is an electronic apparatus to be used as a default and then the second electronic apparatus is used, the threshold value is set shortly as compared with a case in which the state of the operation panel is changed to the second state after the first electronic apparatus is used and then the second electronic apparatus is used.

8. The window change control method of claim 1, wherein in the automatically changing of the state of the operation panel, when it is recognized that the user is changed with another user before the non-operation continuation time exceeds the threshold value, the state of the operation panel is automatically changed to the first state immediately.

9. The window change control method of claim 1, further comprising:
 automatically changing the state of the operation panel to a third state when a non-operation state is continued in the first state for a predetermined time or more; and
 receiving a setting for selecting one of automatically changing the state of the operation panel from the second state to the first state and automatically changing the state of the operation panel from the second state to the third state directly without passing through the first state, as the automatically changing of the state of the operation panel from the second state in a case that the first electronic apparatus has been used,
 wherein in the automatically changing of the state of the operation panel from the second state, in the case that the first electronic apparatus has been used, the state of the operation panel is changed in accordance with the received setting.

10. The window change control method of claim 1, further comprising: receiving a setting of an initial value of the threshold value.

11. The window change control method of claim 1, further comprising: receiving a setting of a degree of a change in the threshold value, which is used in the changing of the threshold value.

12. The window change control method of claim 1, wherein when a use order of the first electronic apparatus and the second electronic apparatus is previously set, in the changing of the threshold value, in a case that the operation panel is changed to the second state in accordance with the user's operation which is not matched with the use order, the threshold value is set shortly as compared with a case in which the user's operation is matched with the use order.

13. The window change control method of claim 12, further comprising: receiving a setting of the use order.

14. A non-transitory computer-readable recording medium in which a program is stored, wherein the program causes a computer to execute the window change control method of claim 1.

15. A window change control device for controlling a change in a window displayed on an operation panel which is commonly used for displaying a first operation window for using a first electronic apparatus and for displaying a second operation window for using a second electronic apparatus, the device comprising:
  a processor configured to:
    switch a state of the operation panel between a first state in which the first operation window is displayed to a second state in which the second operation window is displayed, responsive to a user's operation;
    measure a first elapsed time until a next operation is received after the state of the operation panel is changed from the first state to the second state, the first elapsed time elapsing since the state of the operation panel is changed from the first state to the second state, or a second elapsed time when any operation is received after the state of the operation panel is changed to the second state, the second elapsed time elapsing since a final operation is received, as a non-operation continuation time;
    automatically change the state of the operation panel from the second state to the first state when the non-operation continuation time exceeds a threshold value; and
    change the threshold value in accordance with a use result of the first electronic apparatus and the second electronic apparatus, in which the user uses the first electronic apparatus and/or the second electronic apparatus since the user starts using the first electronic apparatus or the second electronic apparatus.

16. The window change control device of claim 15, wherein the processor increases the threshold value when the first electronic apparatus is used.

17. The window change control device of claim 15, wherein the processor decreases the threshold value when the second electronic apparatus is used.

18. The window change control device of claim 15, wherein the first electronic apparatus is an electronic apparatus which is used as a default.

19. The window change control device of claim 15, wherein when the state of the operation panel is changed to the second state without using the first electronic apparatus which is an electronic apparatus to be used as a default, the processor sets the threshold value shortly as compared with a case in which the state of the operation panel is changed to the second state after the first electronic apparatus is used.

20. The window change control device of claim 15, wherein when the state of the operation panel is changed to the second state after the first electronic apparatus which is an electronic apparatus to be used as a default is used and then the second electronic apparatus is used, the processor sets the threshold value shortly as compared with a case in which the state of the operation panel is changed to the second state without using the first electronic apparatus and then the second electronic apparatus is not used.

21. The window change control device of claim 15, wherein when the state of the operation panel is changed to the second state without using the first electronic apparatus which is an electronic apparatus to be used as a default and then the second electronic apparatus is used, the processor sets the threshold value shortly as compared with a case in which the state of the operation panel is changed to the second state after the first electronic apparatus is used and then the second electronic apparatus is used.

* * * * *